April 16, 1963     K. ZWICK     3,085,477
MACHINE TOOL

Filed Oct. 11, 1960     3 Sheets—Sheet 1

April 16, 1963   K. ZWICK   3,085,477
MACHINE TOOL

Filed Oct. 11, 1960   3 Sheets-Sheet 3

United States Patent Office 3,085,477
Patented Apr. 16, 1963

3,085,477
MACHINE TOOL
Kurt Zwick, Munich, Germany, assignor to Hans Deckel, Munich, Germany, and Friedrich Wilhelm Deckel, Lorettohoh, Zug, Switzerland
Filed Oct. 11, 1960, Ser. No. 61,912
Claims priority, application Germany Oct. 13, 1959
9 Claims. (Cl. 90—13.1)

The present invention relates to a machine tool, and more particularly to a milling machine of the kind frequently called a copying milling machine, wherein a work piece is milled so as to reproduce or copy the shape of a pattern or model.

When working on large workpieces, such as dies, it is desirable to perform the work in at least two operations, a rough milling operation and a fine milling operation. To perform the rough milling with a high cutting capacity, it is necessary that the machine tool parts be of relatively large size in order to withstand the high forces acting on the tool and the copying attachment, and consequently the parts must be of relatively heavy weight. But during the fine milling operation, such an arrangement is undesirable, since ease of movement and relatively light weight of the movable parts are necessary for the efficient and accurate accomplishment of the fine machining.

The use of two separate milling machines, one with large and heavy moving parts for rough milling and the other with smaller and lighter moving parts for the finishing operation, is inefficient and undesirable both because of the time and effort required in removing the work and the pattern from the first machine and resetting them in proper relation to each other on the second machine, and also because it is impossible to perform a finishing operation on one part of the work which has already been roughed, simultaneously with continuance of the roughing operation on another part of the work.

Also it is inefficient and undesirable to employ a machine of a kind heretofore proposed, in which the single machine has both a rough cutting spindle and a fine cutting or finishing spindle, both controlled from the same tracer or stylus. In such a machine, although resetting of the work and the pattern may not be necessary it is nevertheless impossible to perform finishing operations on one part of the work simultaneously with roughing operations on another part. Moreover, in machines of this kind considerable time and effort are usually required to unchuck the roughing cutter and remove it and also the roughing spindle and spindle head, and to set up the fine milling cutter ready for use.

It is an object of the present invention to overcome the difficulties and undesirable features above mentioned, and to provide a generally improved and more satisfactory milling machine of the copying type.

Another object of the invention is the provision of a simple, efficient, and compact machine in which rough milling operations may be performed under the control of a pattern, simultaneously with performance of finishing or fine milling operations under control of the same pattern, on another portion of the work which has already been roughed.

A further object is the provision of a machine having the advantages just described, in combination with the further advantages that the finishing operation is performed by small and light parts easily moved by hand and sensitive to the feel of the operator, while the roughing operation is performed by larger, heavier, and stronger parts capable of taking heavy cuts under considerable working pressure.

These and other desirable objects may be attained in the manner disclosed as an illustrative embodiment of the invention in the following description and in the accompanying drawings forming a part hereof, in which.

The same reference numerals throughout the several views indicate the same parts.

In the preferred embodiment of the invention as here illustrated, there is a main machine column or base 10 the top of which may have an oblique or inclined clamping face as already known in the art. The rear face of the column is substantially vertical, is elongated in a horizontal direction, and carries horizontally extending guideways 12 and 14, along which a support 16 travels horizontally. The rear face of this support has vertical guideways along which a gear box 18 is vertically displaceable in the direction of the arrows $a$ in FIG. 1.

Figure 1:
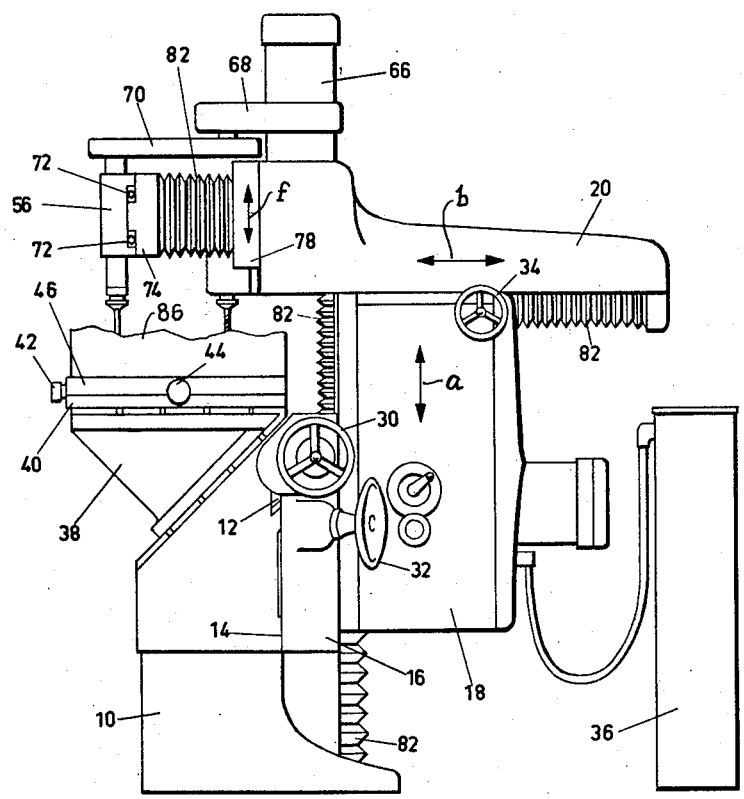
FIG. 1 is a side elevation of a machine in accordance with a preferred embodiment of the invention, with some parts omitted for the sake of greater clarity.

On the gear box 18 (preferably but not necessarily at the top thereof) there is a horizontal guideway extending in a direction at right angles to the direction of the horizontal guideways 12, 14, and along this guideway the milling carriage 20 is movable horizontally backwardly and forwardly in the direction of the arrows $b$ in FIG. 1. Thus the milling carriage 20 may move in three coordinate directions (three mutually perpendicular directions) relative to the stationary column 10, i.e., in the direction of the arrows $a$ when the gear box 18 moves vertically, in the direction of the arrows $b$ when the milling carriage moves on the gear box, and in the direction of the arrows $c$ (FIG. 2) when the support 16 moves on its guideways, carrying the parts 18 and 20 bodily with it. All three of these coordinate movements are preferably performed by positive feed moves (i.e., screw feed means or hydraulic feed means) well known per se and hence not here shown.

Figure 3:
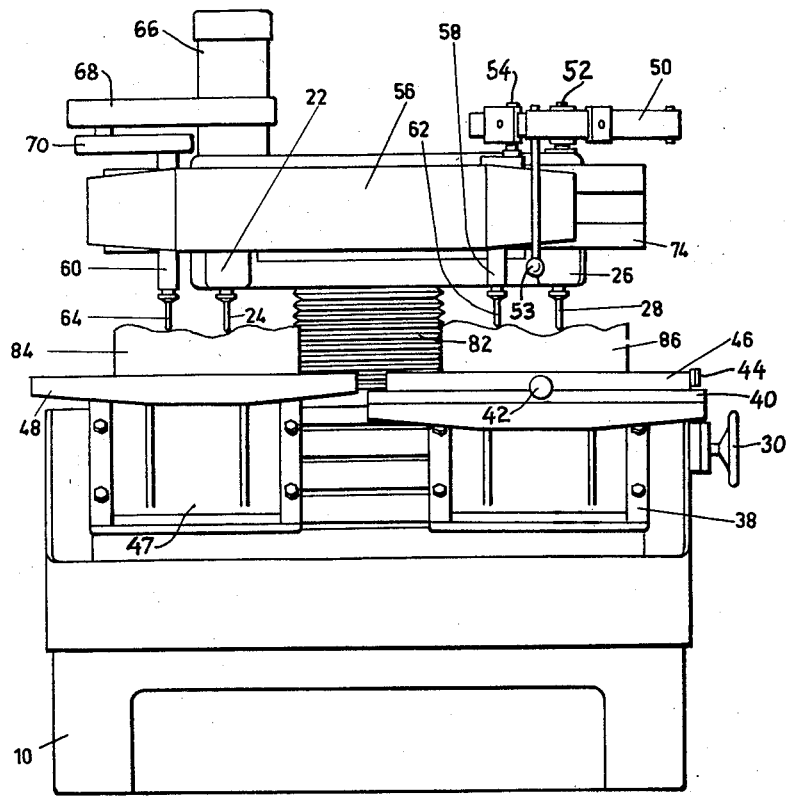
FIG. 3 is a front elevation thereof.

The parts thus far described may all be of relatively strong and heavy or massive construction, capable of withstanding large forces in performing heavy cutting or milling operations. The milling carriage 20 thus provides a good sturdy support for the milling head 22 which is mounted thereon and which in turn carries the rough milling spindle in which the rough milling cutter 24 (FIG. 3) is mounted. There is also mounted on the carriage 20, at some distance from the head 22, a tracer holder 26 in which is mounted the tracer or stylus 28 (FIG. 3) used in the rough milling operations.

The spindle of the rough milling cutter 24 is driven in any conventional known manner. The positive feed movements of the members 16, 18, and 20 on the respectively preceding members which support them may be effected by the hand wheels 30, 32, and 34, respectively, or by conventional power feed means automatically controlled from the tracer or feeler 28 by control mechanism of known form in the control cabinet 36. Among the satisfactory known forms of such automatic control mechanism are those disclosed, for example, in German Patent 1,013,490 or German Patent 1,013,492 or in the book "Fühlergesteuerte Maschinen" by Wolfgang Schmid and Friedrich Olk, published in 1939 by Buchverlag W. Girardet, of Essen, Germany.

When the top of the machine column 10 is inclined or oblique, as in the preferred construction, a knee or adapter member 38 of triangular cross section (see FIG. 1) is clamped to the inclined surface by use of the clamping slots thereof, and the knee has a top horizontal surface to which is fastened a horizontal table 40. This table 40 supports a horizontal model table or pattern table 46 which is adjustable on the table 40 in two horizontal directions at right angles to each other by suitable adjusting means such as the adjusting screws 42 and 44. If the knee 38 is not large enough to support the work table as well as the pattern table, then a second knee 47 (FIG. 3) similar to the knee 38 is fixed to the inclined top of the column 10, and supports the horizontal work table 48.

A pantograph 50 (shown in FIGS. 2 and 3, but omitted from FIG. 1 for clarity) is supported on the bearing 52 on the milling carriage 20. The details of construction of the pantograph are not important for purposes of the present invention; it may be of any known kind commonly used in connection with machine tools. At the end of the pantograph remote from the bearing 52 the pantograph has a depending bar 53 (FIG. 3) serving as a handle to be grasped by the operator for conveniently manipulating the pantograph linkage in any desired direction. At an intermediate point between the bearing 52 and the handle 53, one bar of the pantograph linkage is pivotally connected at 54 to a rail or beam 56 which carries two mounts or holders 58 and 60 spaced from each other by the same center-to-center distance as that between the rough milling cutter 24 and the rough tracing stylus 28, the line between the holders 58 and 60 being parallel to the line between the elements 24 and 28. The mount 58 carries the fine or finishing tracing stylus 62. The mount 60 carries the spindle of the fine or finishing milling cutter 64 driven in any suitable known manner, as for example from a motor 66 mounted on the member 20 and operatively connected to the spindle of the fine cutter 64 by a belt drive extending through articulated belt housings 68 and 70. These may be the same as or similar to the belt drive and articulated housings disclosed in Zwick Patent 2,204,841 of June 18, 1940.

The rail or beam 56 is supported from the milling carriage 20 for movement in all directions always parallel to itself; that is, for movement in all directions of translation relative to the milling carriage, but is restrained against any movement of rotation relative to the milling carriage. To accomplish this, the rail 56 moves horizontally parallel to the direction of movement of the support 16, on oblique roller guides 72 by which it is supported on a second rail or beam 74. The oblique roller guides may take the form of crossed rollers as known in the art; see for example Zwick Patent 2,242,498 of May 20, 1941. The movement of the rail 56 on the second rail 74 is in the direction of the arrows *d* in FIG. 2.

Figure 2:
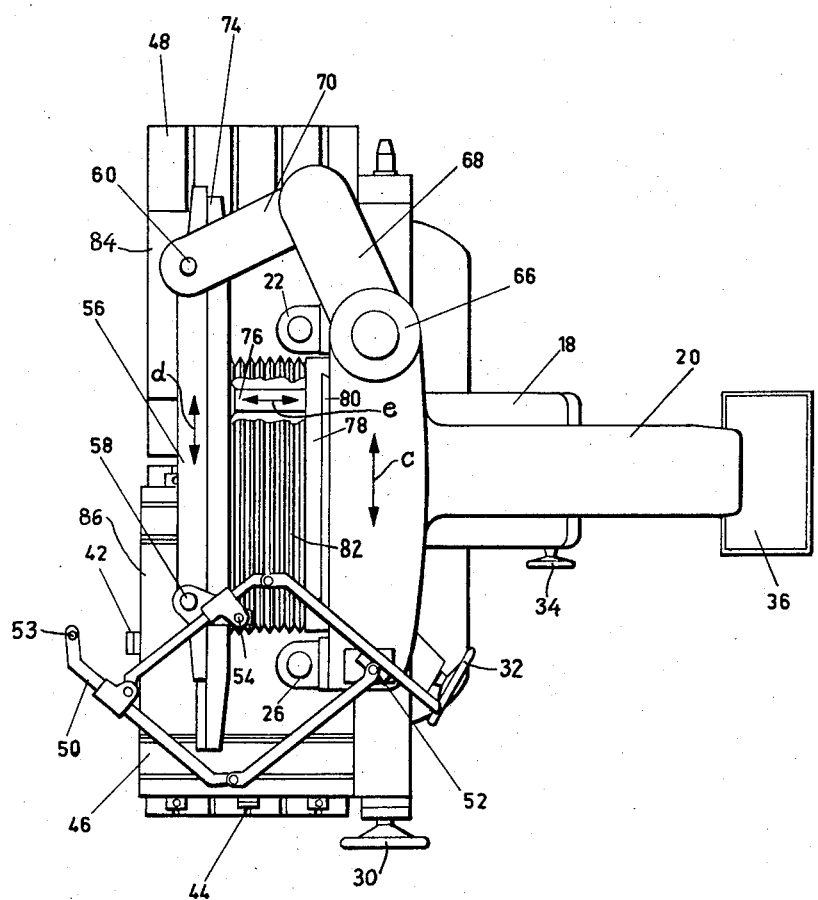
FIG. 2 is a top plan view thereof, showing also some of the parts omitted from FIG. 1.

The second rail 74, in turn, is movable horizontally at right angles to the direction of movement of the rail 56 (and to the direction of movement of the support 16) by means of a pair of horizontally extending guide rails 76 (only one of which is shown in FIG. 2) which project rearwardly from the rear face of the beam 74 and which are supported by oblique roller guides (like the guides 72) from a support member 78 which is vertically movable along a vertical guideway 80 on the front face of the milling carriage 20. The movement of the second rail 74 relative to the support member 78 is in the direction of the arrow *e* in FIG. 2. The movement of the support member 78 relative to the milling carriage 20 is in the direction of the arrows *f* in FIG. 1.

The various slides or guideways are covered by bellows 82, to protect them from entrance of chips, dirt, or other foreign matter.

The rails 56 and 74, and the support member 78, are all relatively light in weight and easily movable by hand along low-friction guides, and the weight of these parts is counterbalanced by conventional counterbalancing means. The movements of these parts being only in connection with fine or finish milling rather than rough milling, only relatively light forces are applied to them, and a massive sturdy construction is not necessary. It may be mentioned here that the pantograph linkage serves as a preferred convenient handle for easy control of the movements of the rail 56 in motion-reducing and force-increasing manner as compared to the motion and force manually applied to the handle 53 of the pantograph linkage. The pantograph linkage in this instance does not serve, as it does in some copying machines, to reduce or enlarge the size of the copy as compared with the original model or pattern. The machine of the present invention in its preferred form is intended to make reproductions on a one-to-one scale; that is, the copy is of equal size with the original model or pattern. The main bearing 52 of the pantograph linkage, as well as the pivotal connection 54 to the rail 56, are in the nature of universal joints or ball and socket joints, so that the pantograph is not restrained to movement in a horizontal plane but may tilt upwardly and downwardly to cause upward and downward movements of the rail 56 (and the members 74, 76, and 78 with it) as may be necessary to follow the relief of the pattern or model. The upward and downward movements are easily accomplished because the weight is counterbalanced as above mentioned.

The range of movement of the rail or beam 56 with respect to the carriage 20, in all three coordinate directions, is sufficiently great so that the tool 64 and tracer 62 may reach the extreme portions of the workpiece and pattern (e.g., the forward left-hand corner thereof) even when the carriage 20 is positioned so that its tool 24 is at the extreme opposite portion of the workpiece (e.g., at the rearward right-hand corner thereof) so that as a practical matter the working range of the tool 64 may be said to be equal to the working range of the tool 24.

In use, the workpiece 84 is fastened to the work table 48, and the model or pattern is fastened to the pattern table 47. The position of the pattern may be adjusted relative to the work in a horizontal direction, by the adjusting means 42 and 44, so that corresponding points of the work and pattern will be at the same distance and direction from each other as the distance and direction from 24 to 28, and from 64 to 62, as will be understood by those skilled in the copying machine art.

The rough milling spindle is then started into operation, and its cutter 24 is caused (possibly by hand, but preferably by the automatic control in the cabinet 36) to travel over the work 84 while the tracing stylus 28 travels over the pattern 86. The feeding motions of the cutting tool, regardless of whether accomplished by manual turning of the hand wheels or by the automatic mechanism, are in either event performed by positive feed means (screw or hydraulic) of conventional kind, so that high cutting pressures of the tool against the work can be produced, and the rough milling operation can proceed rapidly.

As soon as the rough milling operation has worked a sufficiently large area of the workpiece, the finishing work with the fine milling cutter 64 can be started by hand, independently of and simultaneously with the continuance of the rough milling preferably under the influence of the automatic control, or possibly under the influence of a second operator who operates the hand controls 30, 32, and 34. These hand controls are conveniently positioned for possible use by a second operator who stands behind the machine in position to observe the travel of the tracer 28 over the pattern 86, without interfering with the first operator who stands in front of the machine in position to grasp the manual finishing control handle 53 and to observe both the travel of the finishing tracer 62 over the pattern 86 and the travel of the finishing cutter 64 over the work 84. Although the finishing milling parts are supported from the rough milling carriage 20, the movements of the carriage 20 in its three coordinate directions during the roughing operation do not preclude satisfactory simultaneous operation of the finish milling parts, since the movement of the latter is very free and easy, and there is no difficulty in holding the finishing parts manually in a desired position or moving them in a desired direction notwithstanding the different motions of the carriage 20 which are occurring at the same time.

With this arrangement, there is a considerable shortening of the overall time required to complete both the rough and finish machining operations, and it is all done without any need to change or reset the position of either the workpiece or the pattern, or to change or remove any cutter or any tracer.

Depending on the nature of the pattern or model 86, either the straight milling method or the contour milling method may be used. If the job is to machine a single workpiece, it is preferable to employ the straight milling method, to avoid having the roughing tools and the finishing tools get in each other's way. On the other hand, if a plurality of smaller workpieces are machined from a pattern plate (e.g., a multiple pattern, containing a plurality of reproductions of the desired pattern) the contour milling method can be used. Each individual workpiece is then first worked by the rough milling cutter, and then by the fine milling cutter while the rough milling cutter is operating upon a different workpiece and the rough tracer is in contact with a different section of the multiple pattern.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims. Among the possible variations which will be obvious to those skilled in the art once they are acquainted with the foregoing specific embodiment, there may be mentioned the possibility that instead of having the workpiece and the pattern fixed and having the roughing cutter and roughing tracer movable in three coordinate directions relative to the fixed work and pattern, the reverse arrangement may be used, with the roughing spindle holder and roughing tracer holder applied rigidly to a stationary machine column, and with the work table and pattern table movable together in three coordinate directions relative to the stationary machine column. The independent manually movable fine milling parts (finishing spindle and finishing tracer and supporting rails or beams) can then be supported either on the stationary frame or column of the machine, or on one of the movable parts partaking of some or all of the coordinate movements of the work and pattern tables.

What is claimed is:

1. A copying milling machine for simultaneously performing rough and finishing cutting operations on different portions of the same work piece, comprising means for holding a workpiece and a pattern, means for holding a rough milling tool and a roughing tracer in positions to engage respectively with said workpiece and said pattern, said workpiece and pattern holding means and said tool and tracer holding means including means mounting said workpiece and pattern on one hand and said tracer and tool on the other hand for movement relative to each other in three coordinate directions, positive feed means for causing relative movements between said workpiece and said tool while they are engaged with each other and for simultaneously causing corresponding relative movements between said pattern and said tracer while they are engaged with each other, means for holding a finishing cutting tool and a finishing tracer for movement relative to said workpiece and pattern in three coordinate directions while said finishing cutting tool and finishing tracer are engaged respectively with the same workpiece and pattern engaged by said rough milling tool and roughing tracer, means for driving said finishing cutting tool independently of said rough milling tool, and hand operated means for moving said finishing cutting tool and finishing tracer together relative to said workpiece and pattern independently of and simultaneously with relative movements of said workpiece and rough milling tool with respect to each other.

2. A copying milling machine for simultaneously performing rough and finishing cutting operations on different portions of the same work piece, comprising means for holding a workpiece and a pattern, means for holding a rough milling tool and a roughing tracer in positions to engage respectively with said workpiece and said pattern, said workpiece and pattern holding means and said tool and tracer holding means including means mounting said workpiece and pattern on one hand and said tracer and tool on the other hand for movement relative to each other in three coordinate directions, positive feed means for causing relative movements between said workpiece and said tool while they are engaged with each other and for simultaneously causing corresponding relative movements between said pattern and said tracer while they are engaged with each other, means for holding a finishing cutting tool and a finishing tracer for movement relative to said workpiece and pattern in three coordinate directions while said finishing cutting tool and finishing tracer are engaged respectively with the same workpiece and pattern engaged by said rough milling tool and roughing tracer, said tools and tracers being so positioned that the distance between said rough milling tool and said roughing tracer is the same as the distance between said finishing cutting tool and said finishing tracer and the direction of said rough milling tool from said roughing tracer is at all times parallel to the direction of said finishing cutting tool from said finishing tracer, means for driving said finishing cutting tool independently of said rough milling tool, and hand operated means for moving said finishing cutting tool and finishing tracer together relative to said workpiece and pattern independently of and simultaneously with relative movements of said workpiece and rough milling tool with respect to each other.

3. A copying milling machine for simultaneously performing rough and finishing cutting operations on different portions of the same work piece, comprising means for holding a workpiece and a pattern, means for holding a rough milling tool and a roughing tracer in positions to engage respectively with said workpiece and said pattern, said workpiece and pattern holding means and said tool and tracer holding means including means mounting said workpiece and pattern on one hand and said tracer and tool on the other hand for movement relative to each other in three coordinate directions, positive feed means for causing relative movements between said workpiece and said tool while they are engaged with each other and for simultaneously causing corresponding relative movements between said pattern and said tracer while they are engaged with each other, means for holding a finishing cutting tool and a finishing tracer for movement relative to said workpiece and pattern in three coordinate directions while said finishing cutting tool and finishing tracer are engaged respectively with the same workpiece and pattern engaged by said rough milling tool and roughing tracer, means for driving said finishing cutting tool independently of said rough milling tool, and hand operated motion reducing and force increasing pantograph linkage means for moving said finishing cutting tool and finishing tracer together relative to said workpiece and pattern independently of and simultaneously with relative movements of said workpiece and rough milling tool with respect to each other.

4. A copying milling machine for simultaneously performing rough and finishing cutting operations on different portions of the same work piece, comprising means for holding a workpiece and a pattern, means for holding a rough milling tool and a roughing tracer in positions to engage respectively with said workpiece and said pattern, said workpiece and pattern holding means and said tool and tracer holding means including means mounting said workpiece and pattern on one hand and said tracer and tool on the other hand for movement relative to each other in three coordinate directions, means for causing relative movements between said workpiece and said tool while they are engaged with each other and for simultaneously causing corresponding relative movements between said pattern and said tracer while they are engaged with each other, means for holding a finishing cutting tool and a finishing tracer for movement relative to said workpiece and pattern in three coordinate directions while said finishing cutting tool and finishing tracer are engaged respectively with the same workpiece and pattern engaged by said rough milling tool and roughing tracer, and means for moving said finishing cutting tool and finishing tracer together relative to said workpiece and pattern independently of and simultaneously with relative movements of said workpiece and rough milling tool with respect to each other.

5. A copying milling machine for simultaneously performing rough and finishing cutting operations on different portions of the same work piece, comprising a stationary machine column, means on said column for holding a workpiece and a pattern in stationary position, a milling carriage mounted for movement relative to said column in three coordinate directions, means on said carriage for holding a rough milling tool and a roughing tracer in spaced relation to each other and in positions to engage respectively with said workpiece and pattern, a rail supported from said carriage for movement of translation without rotation in three coordinate directions relative to said carriage, independently of motions of said carriage relative to said column, means on said rail for holding a finishing cutting tool and a finishing tracer in spaced relation to each other and in positions to engage respectively with said workpiece and pattern, and means for driving said finishing cutting tool independently of said rough milling tool.

6. A copying milling machine for simultaneously performing rough and finishing cutting operations on different portions of the same work piece, comprising a stationary machine column, means on said column for holding a workpiece and a pattern in stationary position, a milling carriage mounted for movement relative to said column in three cordinate directions, means on said carriage for holding a rough milling tool and a roughing tracer in spaced relation to each other and in positions to engage respectively with said workpiece and pattern, a rail supported from said carriage for movement of translation without rotation in three coordinate directions relative to said carriage, independently of motions of said carriage relative to said column, means on said rail for holding a finishing cutting tool and a finishing tracer in spaced relation to each other and in positions to engage respectively with said workpiece and pattern, a pantograph linkage pivotally mounted on said carriage and having an operating handle remote from said carriage, a pivotal operating connection between said linkage and said rail at a point intermediate said operating handle and carriage, so that said linkage acts as a lever system to move said rail with decreased motion and increased force with respect to motion and force produced on said operating handle, and means for driving said finishing cutting tool independently of said rough milling tool, whereby said roughing tracer and rough milling tool may be used to perform a roughing operation on one portion of said workpiece while said finishing cutting tool and said finishing tracer simultaneously may be moved over other portions of the workpiece and pattern respectively, by hand pressure applied to said operating handle, to perform a finishing operation on said other portion of the workpiece during the progress of the roughing operation on the first mentioned portion thereof.

7. A copying milling machine for simultaneously performing rough and finishing cutting operations on different portions of the same work piece, comprising a stationary machine column, means on said column for holding a workpiece and a pattern in stationary position, a milling carriage mounted for movement relative to said column in three coordinate directions, means on said carriage for holding a rough milling tool and a roughing tracer in spaced relation to each other and in positions to engage respectively with said workpiece and pattern, a rail supported from said carriage for movement of translation without rotation in three coordinate directions relative to said carriage, independently of motions of said carriage relative to said column, means on said rail for holding a finishing cutting tool and a finishing tracer in spaced relation to each other and in positions to engage respectively with said workpiece and pattern, a driving motor mounted on said carriage, and means including an articulated belt housing connected both to said carriage and to said rail for driving said finishing cutting tool from said motor independently of said rough milling tool.

8. A copying milling machine for simultaneously performing rough and finishing cutting operations on different portions of the same work piece, comprising a stationary machine column, means on said column for holding a workpiece and a pattern in stationary position, a milling carriage mounted for movement relative to said column in three coordinate directions, means on said carriage for holding a rough milling tool and a roughing tracer in spaced relation to each other and in positions to engage respectively with said workpiece and pattern, a rail supported from said carriage for movement of translation without rotation in three coordinate directions relative to said carriage, independently of motions of said carriage relative to said column, means on said rail for holding a finishing cutting tool and a finishing tracer in spaced relation to each other and in positions to engage respectively with said workpiece and pattern, means for driving said finishing cutting tool independently of said rough milling tool, automatically controlled power feed means for moving said carriage relative to said column, and hand operated feed means for moving said rail relative to said column independently of movements of said carriage.

9. A copying milling machine for simultaneously performing rough and fine pattern-controlled milling operations on the same work piece under control of different portions of the same pattern, said machine comprising stationary supporting means for supporting both a work piece and a pattern in side by side relation to each other, a milling carriage mounted for movement relative to said supporting means in three coordinate directions, means on said carriage for holding a rough milling tool and a roughing tracer in fixed spatial relation to each other and in positions to engage respectively with the work piece and the pattern, so that by moving said carriage relatively to said stationary supporting means said roughing tracer may be caused to travel over a portion of the surface of the pattern and said roughing tool will perform similar movements with respect to the work piece, a rail mounted on and supported from and movable bodily with said carriage and also being movable relatively to the carriage in three coordinate directions of translation without movement of rotation, means on said rail for holding a fine milling tool and a finishing tracer in fixed spatial relation to each other and in positions to engage respectively with a different portion of the work piece and a different portion of the pattern from those respectively engaged by the rough milling tool and the roughing tracer, so that by moving said rail relatively to said carriage said fine milling tool may be caused to travel over said different portion of the surface of the pattern and said finishing tracer will perform similar movements with respect to said different portion of the work piece, and a manually controlled pantograph linkage having a fulcrum on and supported by said carriage and having an operative connection with said rail at one distance from said fulcrum and having a manual control handle at a greater distance from said fulcrum, so that movements of said rail either jointly with or different from these of said carriage, as desired, may be controlled by manual force exerted on said handle.

References Cited in the file of this patent
UNITED STATES PATENTS 1,972,910    Zwick _____ Sept. 11, 1934

FOREIGN PATENTS 512,915    Great Britain _____ Sept. 28, 1939